(12) United States Patent
Nakayasu et al.

(10) Patent No.: US 11,990,990 B2
(45) Date of Patent: May 21, 2024

(54) RELAY DEVICE AND COMMUNICATION SYSTEM

(71) Applicant: Mitsubishi Electric Corporation, Tokyo (JP)

(72) Inventors: Toshiyuki Nakayasu, Tokyo (JP); Sachiko Taniguchi, Tokyo (JP); Ryusuke Kawate, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 58 days.

(21) Appl. No.: 17/710,070

(22) Filed: Mar. 31, 2022

(65) Prior Publication Data

US 2022/0224430 A1 Jul. 14, 2022

Related U.S. Application Data

(63) Continuation of application No. PCT/JP2020/022691, filed on Jun. 9, 2020.

(30) Foreign Application Priority Data

Dec. 12, 2019 (JP) ................. 2019-224503

(51) Int. Cl.
*H04J 3/06* (2006.01)
*H04L 7/04* (2006.01)
*H04L 7/10* (2006.01)

(52) U.S. Cl.
CPC ............ *H04J 3/0658* (2013.01); *H04L 7/042* (2013.01); *H04L 7/10* (2013.01)

(58) Field of Classification Search
CPC .................................................. H04J 3/0658
See application file for complete search history.

(56) References Cited

U.S. PATENT DOCUMENTS

| | | | |
|---|---|---|---|
| 9,998,247 B1 * | 6/2018 | Choudhury | ........... H04J 3/0602 |
| 2011/0026654 A1 * | 2/2011 | Takeuchi | .............. H04L 12/407 |
| | | | 375/356 |

(Continued)

FOREIGN PATENT DOCUMENTS

| | | |
|---|---|---|
| JP | 2014-183386 A | 9/2014 |
| JP | 6045950 B2 | 12/2016 |

(Continued)

OTHER PUBLICATIONS

IEEE Instrumentation and Measurement Society, "IEEE Standard for a Precision Clock Synchronization Protocol for Networked Measurement and Control Systems", IEEE Std 1588, Jul. 24, 2008, pp. 1-289.

(Continued)

*Primary Examiner* — Abdeltif Ajid
(74) *Attorney, Agent, or Firm* — BIRCH, STEWART, KOLASCH & BIRCH, LLP

(57) ABSTRACT

A relay device includes a plurality of physical ports (111-1 to 111-N) that receive frames, and a layer-2 protocol processing unit (113) that transfers the frame received by one of the physical ports (111-1 to 111-N) from at least one of the physical ports (111-1 to 111-N). The layer-2 protocol processing unit (113) has a filtering function for blocking frames other than a clock-time synchronization frame during transfer involving a port selected from the plurality of physical ports (111-1 to 111-N) as a port that relays only the clock-time synchronization frame used for synchronizing clock time.

10 Claims, 8 Drawing Sheets

(56) References Cited

U.S. PATENT DOCUMENTS

| | | | |
|---|---|---|---|
| 2019/0356403 A1* | 11/2019 | V.K. | ............... H04L 41/12 |
| 2021/0194876 A1 | 6/2021 | Kasahara | |
| 2021/0242953 A1* | 8/2021 | Kitayama | ............. H04J 3/0667 |

FOREIGN PATENT DOCUMENTS

| | | |
|---|---|---|
| JP | 2017-216563 A | 12/2017 |
| WO | WO 2019/220632 A1 | 11/2019 |

OTHER PUBLICATIONS

IEEE P802.1AS-Rev/D7.0, "Timing and Synchronization for Time-Sensitive Applications", Mar. 29, 2018, pp. 1-496.

International Search Report (PCT/ISA/210) issued in PCT/JP2020/022691, dated Sep. 8, 2020.

Written Opinion of the International Searching Authority (PCT/ISA/237) issued in PCT/JP2020/022691, dated Sep. 8, 2020.

Office Action dated Sep. 6, 2022 in counterpart Indian Patent Application No. 202247023570 with an English Translation.

* cited by examiner

RELAY DEVICE AND COMMUNICATION SYSTEM

CROSS-REFERENCE TO RELATED APPLICATION

This application is a Continuation of PCT International Application No. PCT/JP2020/022691, filed on Jun. 9, 2020, which claims priority under 35 U.S.C. § 119(a) to Patent Application No. 2019-224503, filed in Japan on Dec. 12, 2019, all of which are hereby expressly incorporated by reference into the present application.

BACKGROUND OF THE INVENTION

1. Field of the Invention

The present invention relates to a relay device and a communication system.

2. Description of the Related Art

According to IEEE1588 precision time protocol (PTP) or IEEE802.1AS standardized by the Institute of Electrical and Electronics Engineers (IEEE), a grand master (GM), which is a clock-time distribution server including a reference clock of a network, counts reference clock time and distributes clock-time information indicating the clock time in a clock-time synchronization frame, and a device that receives the clock-time information from the GM corrects the clock time. This enables synchronization of the clock time in the network.

An industrial network or a network forming a social infrastructure is composed of a full-duplex system for a network to improve the fault tolerance and has a configuration in which multiple GMs are arranged on the network to achieve highly accurate clock-time synchronization. In a network having a redundant configuration of GMs, one GM is selected to distribute clock time by using the best master clock algorithm (BMCA) or the like to centralize the clock time to be synchronized, and a clock-time distribution tree is generated with the selected GM serving as a starting point.

When a GM in operation enters a state of malfunction or communication failure, another GM for distributing clock-time information is selected from the GMs operating normally to maintain the clock-time synchronization accuracy of the devices belonging to the network (for example, refer to Patent Literature 1).

Patent Literature 1: Japanese Patent No. 6045950

Since a GM distributes clock-time information from a clock-time information distribution port, it is necessary to provide multiple clock-time information distribution ports on the GM when redundancy is established in accordance with the conventional technique.

In general, a GM adopts an expensive, high-precision reference clock using an atomic clock, a global positioning system (GPS), or the like to distribute high-precision clock-time information; thus, a GM is more expensive than a relay device, such as a layer-2 switch (L2SW). The price of a GM increases in proportion to an increase in the number of clock-time information distribution ports.

Therefore, in the conventional technique, a plurality of relatively expensive GMs having many clock-time information distribution ports are arranged on a network to enhance fault tolerance, but the price of GMs causes deterioration in cost.

Accordingly, it is an object of one or more aspects of the present invention to enable clock-time synchronization with high reliability at a low cost.

SUMMARY OF THE INVENTION

A relay device according to an aspect of the present invention includes a plurality of ports to receive frames; and processing circuitry to transfer a frame received at one of the ports to at least one of the ports. The processing circuitry has a filtering function for blocking frames other than a clock-time synchronization frame during transfer involving the port selected from the ports, the clock-time synchronization frame being used for synchronizing clock time.

A communication system according to an aspect of the present invention includes a first network including a first relay device; and a second network including a second relay device and constituting a segment different from a segment of the first network. The first relay device has a plurality of first ports to receive frames; and first processing circuitry to transfer a frame received by one of the first ports from at least one of the first ports. A first clock-time-information relay port included in the first ports is connected to the second relay device. The first processing circuitry has a first filtering function for blocking frames other than a clock-time synchronization frame during transfer involving the first clock-time-information relay port, the clock-time synchronization frame being used for synchronizing clock time. The second relay device further has a plurality of second ports to receive frames; and second processing circuitry to transfer a frame received by one of the second ports to at least one of the second ports. A second clock-time-information relay port included in the second ports is connected to the first relay device. The second processing circuitry has a second filtering function for blocking frames other than the clock-time synchronization frame during transfer involving the second clock-time information relay port.

One or more aspects of the present invention enable clock-time synchronization with high reliability at a low cost.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

First Embodiment

Figure 1:
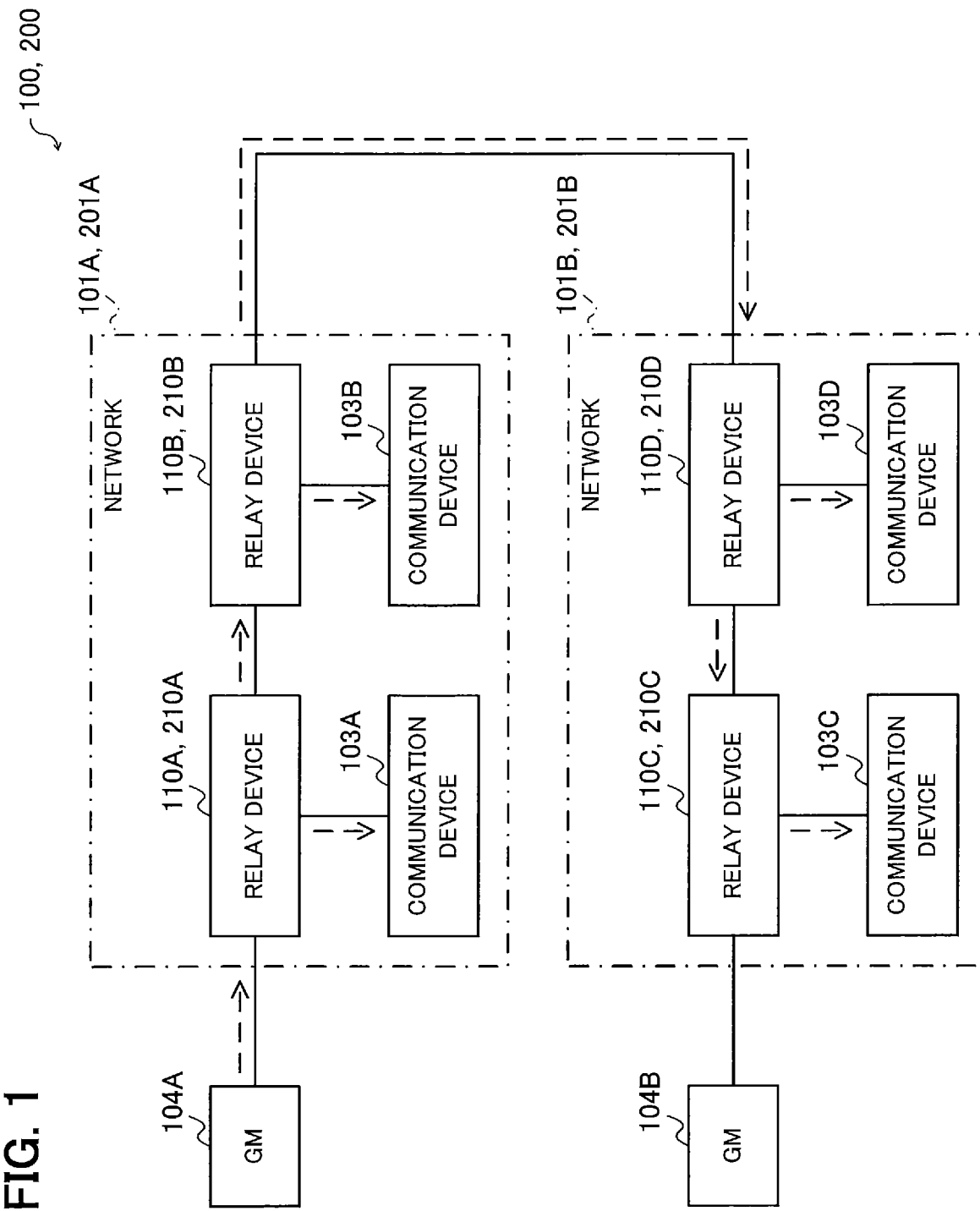
FIG. 1 is a block diagram schematically illustrating a communication system including relay devices according to first and second embodiments.

FIG. 1 is a block diagram schematically illustrating a communication system 100 including relay devices 110A to 110D according to the first embodiment.

The communication system 100 includes a network 101A and a network 101B.

The network 101A includes the relay devices 110A and 110B and communication devices 103A and 103B.

The relay device 110A is connected to a GM 104A, and a clock-time synchronization frame for synchronizing the clock time is sent from the GM 104A to the relay device 110A.

Here, the network 101A is also referred to as a first network. Any one of the relay devices 110A and 110B is also referred to as a first relay device. The GM 104A is also referred to as a first clock-time distribution server, and the clock-time synchronization frame sent from the GM 104A is also referred to as a first clock-time synchronization frame.

The network 101B includes the relay devices 110C and 110D and communication devices 103C and 103D.

The relay device 110C is connected to a GM 104B, and a clock-time synchronization frame for synchronizing the clock time is sent from the GM 104B to the relay device 110C.

Here, the network 101B is also referred to as a second network. Any one of the relay devices 110C and 110D is also referred to as a second relay device. The GM 104B is also referred to as a second clock-time distribution server, and the clock-time synchronization frame sent from the GM 104B is also referred to as a second clock-time synchronization frame.

For example, devices illustrated at the same locations on the network 101A and the network 101B, such as the communication device 103A and the communication device 103C, are disposed in the same area and are capable of providing the same service. When both the network 101A and the network 101B are operating normally, the user can receive the service via both networks 101A and 101B.

The network 101A and the network 101B constitute different segments.

To avoid mixing of communication frames, the network 101A and the network 101B constituting different segments are usually not connected. However, in the communication system 100 according to the first embodiment, the relay devices 110B and 110D having a filter function for transmitting only clock-time synchronization frames are provided to connect the networks 101A and 101B without mixing of the communication frames.

Note that, when both the GM 104A and the GM 104B are operating normally in the configuration illustrated in FIG. 1, the two GMs 104A and 104B are present in the communication system 100; and the GM having high priority (for example, the GM 104A in FIG. 1) is selected by using the BMCA or the like, and relay devices 110A to 110D and the communication devices 103A to 103D connected to both networks 101A and 101B are synchronized with the clock time of the selected GM.

The communication devices 103A and 103B may be any devices capable of communication via the network 101A.

Furthermore, each of the GMs 104A and 104B should include one clock-time-information distribution port for sending clock-time synchronization frames indicating the clock time to be synchronized. The clock-time-information distribution port is a physical port that sends clock-time synchronization frames to a network. Note that the clock time indicated by a clock-time synchronization frame is the reference clock time.

Since the relay devices 110A to 110D have the same configuration, hereinafter, any one of the relay devices 110A to 110D will be referred to as a relay device 110 when there is no need to distinguish between them.

Figure 2:
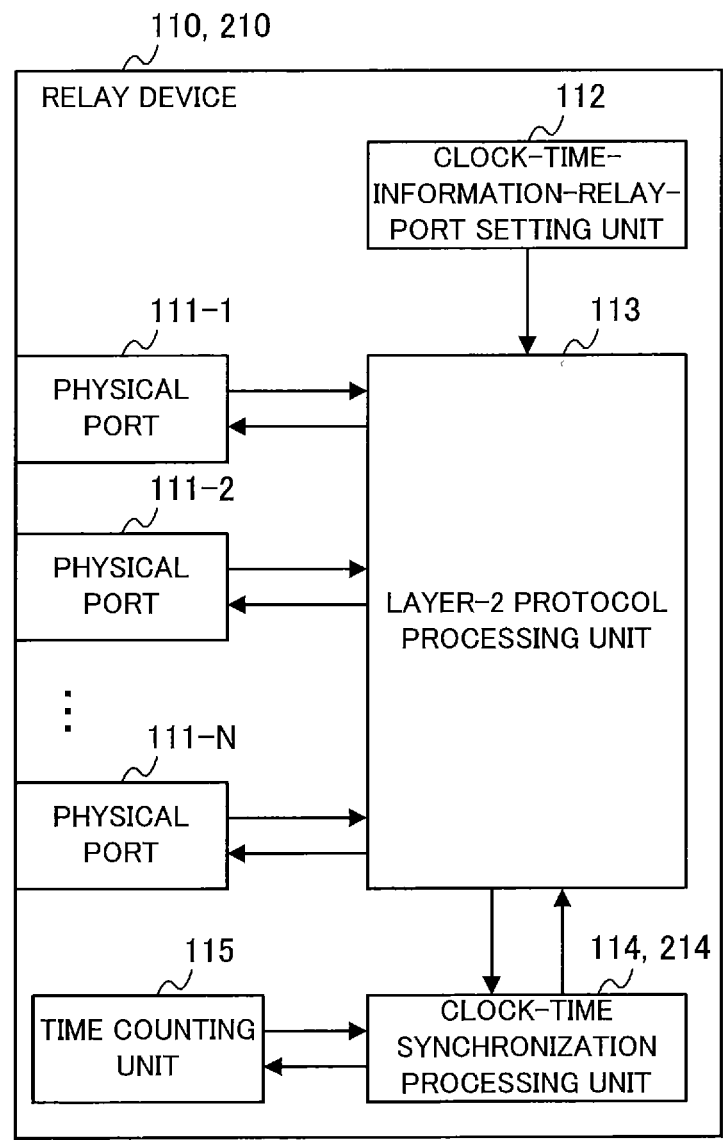
FIG. 2 is a block diagram schematically illustrating the configuration of a relay device according to the first and second embodiments.

FIG. 2 is a block diagram schematically illustrating the configuration of a relay device 110.

The relay device 110 includes a plurality of physical ports 111-1 to 111-N (where N is an integer equal to or greater than two), a clock-time-information-relay-port setting unit 112, a layer-2 protocol processing unit 113, a clock-time synchronization processing unit 114, and a time counting unit 115.

Each of the physical ports 111-1 to 111-N serves as a communication interface for connecting to a network. Each of the physical ports 111-1 to 111-N sends and receives frames.

At least one of the physical ports 111-1 to 111-N is selected by the clock-time-information-relay-port setting unit 112 as a clock-time-information relay port to which a filter function for transmitting only clock-time synchronization frames is applied. The clock-time-information relay port is connected to a relay device 110 of a different segment.

Note that the physical ports 111-1 to 111-N provided in the first relay device are also referred to as first ports, and the physical ports 111-1 to 111-N provided in the second relay device are also referred to as second ports.

The clock-time-information-relay-port setting unit 112 notifies the layer-2 protocol processing unit 113 of a clock-time-information relay port number or physical-port identification information for identifying the clock-time-information relay port to which the filter function for transmitting only clock-time synchronization frames is applied. The clock-time-information relay port is used to connect the two network systems described above and is a physical port to which the filter function for transmitting only clock-time synchronization frames is applied.

The clock-time-information relay port may be predetermined or may be selected by a user.

For example, the clock-time-information-relay-port setting unit 112 receives a designation of a clock-time-information relay port number from a user terminal connected to any of the physical ports 111-1 to 111-N and selects the physical port identified by the designated clock-time-information relay port number to be the clock-time-information relay port.

Note that, although not illustrated, in the case where the relay device 110 is provided with an input unit for receiving input of an instruction from a user, the clock-time-information relay port number may be input through such an input unit.

Note that when a clock-time-information relay port is not used, the clock-time-information-relay-port setting unit 112 does not report the clock-time-information relay port number to the layer-2 protocol processing unit 113 or reports a predetermined number indicating that the clock-time-information relay port is not to be used to the layer-2 protocol processing unit 113. In the communication system 100 illustrated in FIG. 1, the relay device 110B and the relay device 110D use clock-time-information relay ports, but the relay device 110A and the relay device 110C do not use clock-time-information relay ports. Therefore, in the first embodiment, the relay devices 110A and 110C may be relay devices having a clock-time synchronization function.

The layer-2 protocol processing unit 113 is a transfer processing unit that transfers a frame received by one physical port included in the physical ports 111-1 to 111-N from at least one of the physical ports 111-1 to 111-N.

Here, the layer-2 protocol processing unit 113 has a filtering function for blocking frames other than clock-time synchronization frames in the transfer involving the clock-time-information relay ports.

For example, the layer-2 protocol processing unit 113 applies a filtering function to the frames received by the clock-time-information relay port. When the frame received by the clock-time-information relay port is not a clock-time synchronization frame, the layer-2 protocol processing unit 113 deletes the frame. Alternatively, when the frame received by the clock-time-information relay port is not a clock-time synchronization frame, the layer-2 protocol processing unit 113 does not transfer the frame from any of the physical ports 111-1 to 111-N. Here, the frame received by the clock-time-information relay port is also referred to as a first frame.

Specifically, when any of the physical ports 111-1 to 111-N receives a frame, the layer-2 protocol processing unit 113 checks whether or not the physical port that received the frame matches the physical port indicated by the clock-time-information relay port number reported by the clock-time-information-relay-port setting unit 112.

When any of the physical ports 111-1 to 111-N receives a frame, the layer-2 protocol processing unit 113 also checks whether or not the frame is a clock-time synchronization frame.

Figure 3:
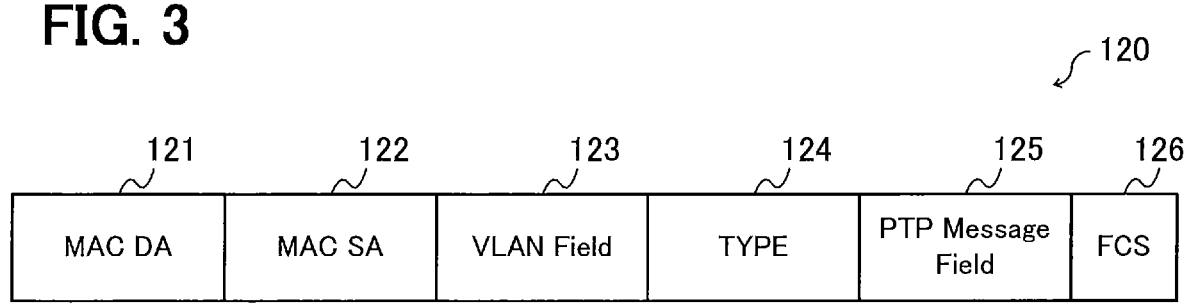
FIG. 3 is a schematic diagram illustrating a format of a clock-time synchronization frame.

FIG. 3 is a schematic diagram illustrating the format of a clock-time synchronization frame defined by IEEE1588 PTP or IEEE802.1AS.

A clock-time synchronization frame 120 includes a media access control destination address (MAC DA) area 121, a media access control source address (MAC SA) area 122, a virtual local area network (VLAN) field area 123, a TYPE area 124, a PTP message field area 125, and a frame check sequence (FCS) area 126.

In the clock-time synchronization frame of the first embodiment, "01-80-C2-00-00-0E" is stored in the MAC DA area 121 for storing a destination MAC address, and "0x88 F7" indicating PTP is stored in the TYPE area 124 for indicating an Ethernet (registered trademark) protocol.

Therefore, the layer-2 protocol processing unit 113 can determine whether or not the received frame is a clock-time synchronization frame by checking the MAC DA area 121 and the TYPE area 124 of the received frame.

Note that since the destination MAC address "01-80-C2-00-00-0E" is a link-by-link address indicating that transfer is not allowed, the clock-time synchronization frame received via the clock-time-information distribution path between the two networks is terminated at the relay device 110 and is discarded without being transferred.

If the checking results in the received frame being a clock-time synchronization frame, the layer-2 protocol processing unit 113 feeds the clock-time synchronization frame to the clock-time synchronization processing unit 114.

In contrast, if the received frame is not a clock-time synchronization frame, and the physical port that received the frame is a clock-time-information relay port, the layer-2 protocol processing unit 113 discards the frame.

If the received frame is not a clock-time synchronization frame, and the physical port that received the frame is not a clock-time information relay port, the layer-2 protocol processing unit 113 refers to the values in the MAC DA area and the VLAN area of the frame and transfers the frame to any of the physical ports other than the physical port that received the frame and the clock-time-information relay port in the same segment as the physical port that received the frame.

In the relay device 110, the frames processed by the clock-time-information relay port through the above-described processing can be limited to clock-time synchronization frames. Here, the frame received by a physical port other than the clock-time-information relay port is also referred to as a second frame.

Note that the filtering function executed by the layer-2 protocol processing unit 113 of the first relay device is also referred to as a first filtering function, and the filtering function executed by the layer-2 protocol processing unit 113 of the second relay device is also referred to as a second filtering function.

The clock-time synchronization processing unit 114 processes the clock-time synchronization frame received from the layer-2 protocol processing unit 113 on the basis of the specification of IEEE1588 PTP or IEEE802.1AS. For example, the clock-time synchronization processing unit 114 controls the time counting unit 115 to synchronize the clock time counted by the time counting unit 115 with the clock time indicated by the clock-time synchronization frame received from the layer-2 protocol processing unit 113.

When the clock-time synchronization processing unit 114 receives the clock-time synchronization frame from the layer-2 protocol processing unit 113, the clock-time synchronization processing unit 114 generates a clock-time synchronization frame on the basis of the specification of IEEE1588 PTP or IEEE802.1AS. The clock-time synchronization processing unit 114 then determines the physical port to which the clock-time synchronization frame generated on the basis of the specification of the IEEE1588 PTP or IEEE802.1AS is to be output.

For example, when the clock-time-information relay port receives the clock-time synchronization frame, the clock-time synchronization processing unit 114 sends the generated clock-time synchronization frame from all physical ports except the physical port that received the clock-time synchronization frame.

In contrast, when a physical port other than the clock-time-information relay port receives the clock-time synchronization frame, the clock-time synchronization processing unit 114 sends the generated clock-time synchronization frame from a physical port in the same segment as the physical port that received the clock-time synchronization frame (excluding the port that received the clock-time synchronization frame) and the clock-time-information relay port.

The time counting unit 115 counts clock time. For example, the time counting unit 115 counts clock time on the basis of a signal from an oscillator or a vibrator transducer, which is a clock source not illustrated.

Note that the plurality of physical ports 111-1 to 111-N of the first relay device is also referred to as a plurality of first physical ports; the clock-time-information-relay-port setting unit 112 of the first relay device is also referred to as a first clock-time-information-relay-port setting unit or first processing circuitry; the layer-2 protocol processing unit 113 of the first relay device is also referred to as a first transfer processing unit or the first processing circuitry; the clock-time synchronization processing unit 114 of the first relay device is also referred to as a first clock-time synchronization processing unit or the first processing circuitry; and the time counting unit 115 of the first relay device is also referred to as a first time counting unit or the first processing circuitry. The clock-time-information relay port of the first relay device is also referred to as a first clock-time-information relay port.

Moreover, the plurality of physical ports 111-1 to 111-N of the second relay device is also referred to as a plurality of second physical ports; the clock-time-information-relay-port setting unit 112 of the second relay device is also referred to as a second clock-time-information-relay-port setting unit or second processing circuitry; the layer-2 protocol processing unit 113 of the second relay device is also referred to as a second transfer processing unit or the second processing circuitry; the clock-time synchronization processing unit 114 of the second relay device is also referred to as a second clock-time synchronization processing unit or the second processing circuitry; and the time counting unit 115 of the second relay device is also referred to as a second time counting unit or the second processing circuitry. The clock-time-information relay port of the second relay device is also referred to as a second clock-time-information relay port.

Figure 4A:
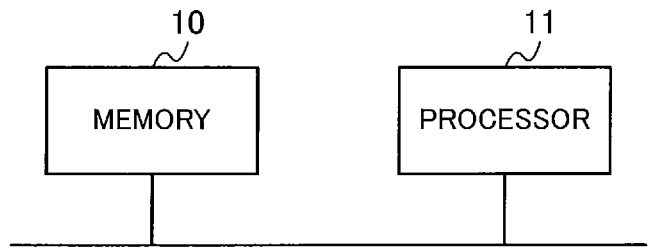
FIGS. 4A and 4B are block diagrams illustrating hardware configuration examples.

For example, a portion or the entirety of the clock-time-information-relay-port setting unit 112, the layer-2 protocol processing unit 113, the clock-time synchronization processing unit 114, and the time counting unit 115 described above can be implemented by, for example, a memory 10 and a processor 11, such as a central processing unit (CPU), that executes the programs stored in the memory 10, as illustrated in FIG. 4A. Such programs may be provided via a network or may be recorded and provided on a recording medium. That is, such programs may be provided as, for example, program products.

Figure 4B:
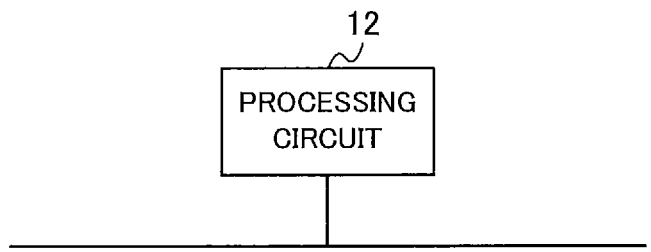

A portion or the entirety of the clock-time-information-relay-port setting unit 112, the layer-2 protocol processing unit 113, the clock-time synchronization processing unit 114, and the time counting unit 115 can be implemented by, for example, a processing circuit 12, such as a single circuit, a composite circuit, a programmed processor, a parallel programmed processor, an application-specific integrated circuit (ASIC), or a field-programmable gate array (FPGA), as illustrated in FIG. 4B.

That is, the clock-time-information-relay-port setting unit 112, the layer-2 protocol processing unit 113, the clock-time synchronization processing unit 114, and the time counting unit 115 can be implemented by processing circuitry.

The advantages of the communication system 100 according to the first embodiment will now be described.

Figure 5:
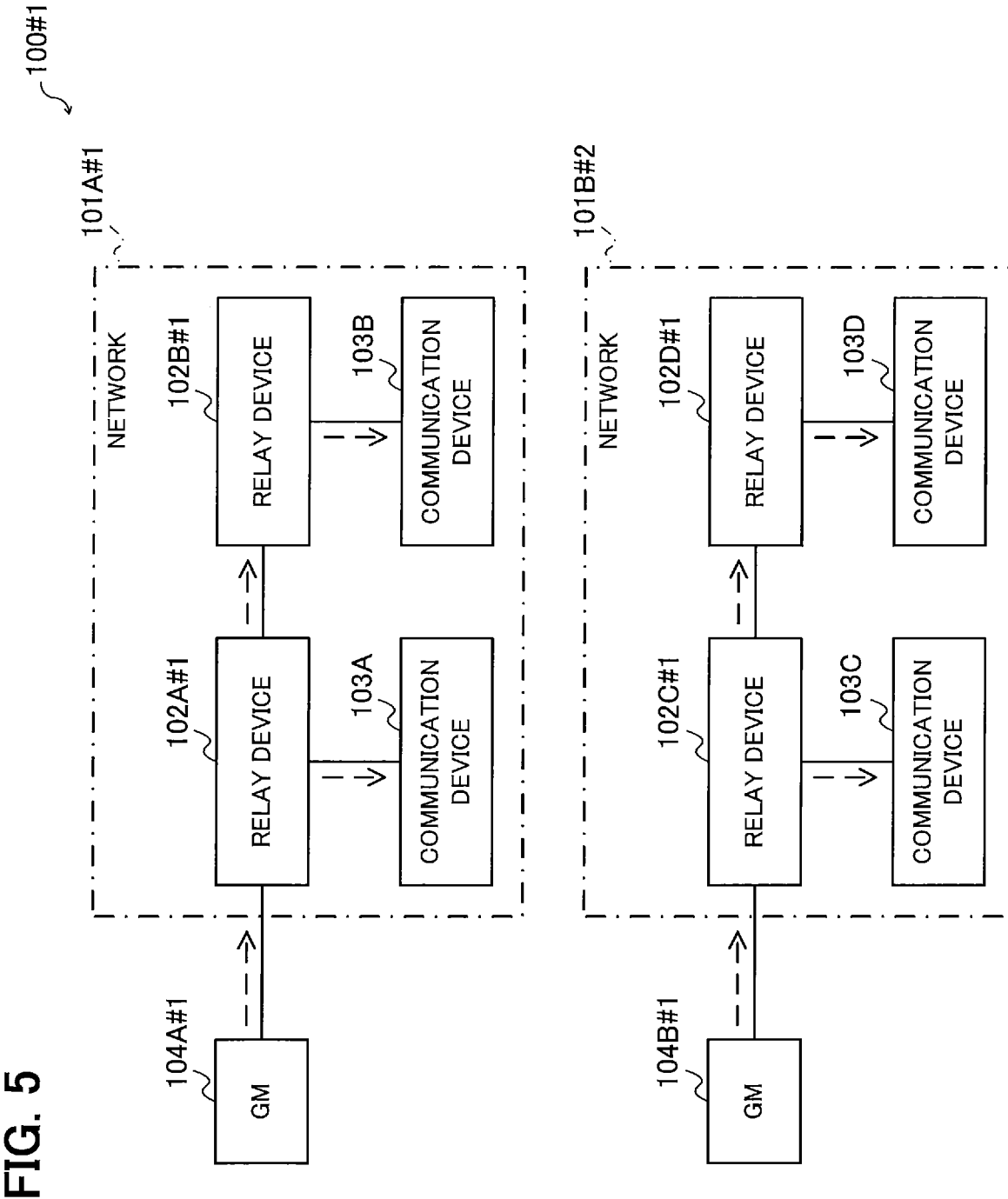
FIG. 5 is a block diagram schematically illustrating the configuration of a communication system according to a first comparative example.

FIG. 5 is a block diagram schematically illustrating the configuration of a communication system 100 #1 according to a first comparative example for comparison with the communication system 100 according to the first embodiment.

The communication system 100 #1 includes a network 101A #1 and a network 101B #1.

The network 101A #1 includes relay devices 102A #1 and 102B #1 and communication devices 103A and 103B.

The relay device 102A #1 is connected to a GM 104A #1, and a clock-time synchronization frame for synchronizing clock time is sent from the GM 104A #1 to the relay device 102A #1.

The network 101B #1 includes relay devices 102C #1 and 102D #1 and communication devices 103C and 103D.

The relay device 102C #1 is connected to a GM 104B #1, and a clock-time synchronization frame for synchronizing clock time is sent from the GM 104B #1 to the relay device 102C #1.

The communication system 100 #1 according to the first comparative example is a simple full-duplex network configuration example consisting of three types of devices: GMs 104A #1 and 104B #1, relay devices 102A #1 to 102D #1, and communication devices 103A to 130D.

Here, each of the relay devices 102A #1 to 102D #1 can be implemented by, for example, a relay device having a clock-time synchronization function.

In the configuration illustrated in FIG. 5, the devices on the network 101A #1 are synchronized with the clock time delivered by the GM 104A #1, and the devices on the network 101B #1 are synchronized with the clock time delivered by the GM 104B #1. In the configuration illustrated in FIG. 5, even if one of the GMs 104A #1 and 104B #1 fails, communication with clock-time synchronization is possible in one network. However, the network including the failed GM cannot provide normal service until the GM is replaced even if the devices other than the GM are operating normally because there is no means for synchronizing the clock time between the devices on the network. Moreover, the service must be stopped in case of double failure, which is a state in which failure or malfunction occurs in an operating network including no failed GMs, before replacement of the failed GM.

Figure 6:
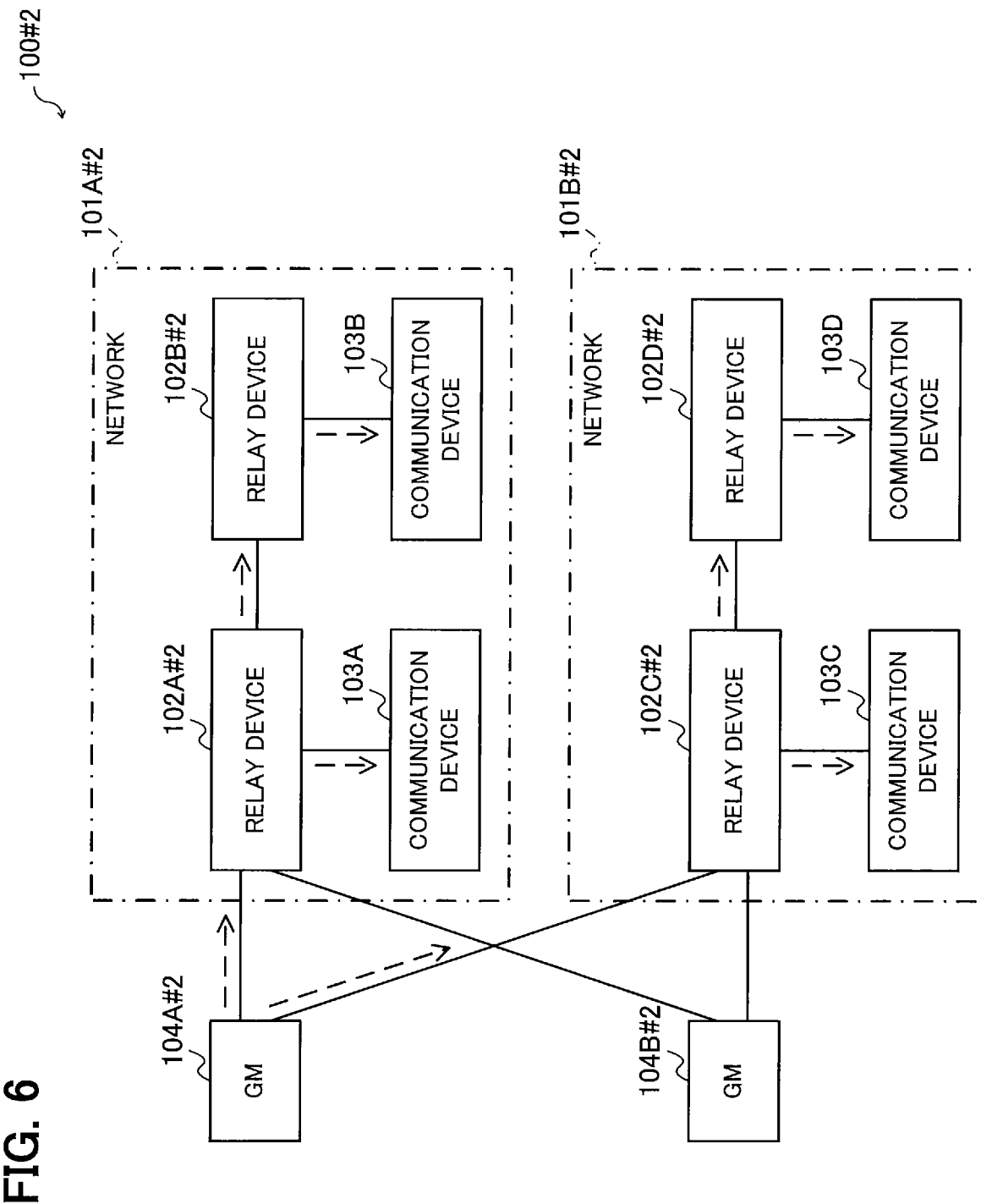
FIG. 6 is a block diagram schematically illustrating the configuration of a communication system according to a second comparative example.

FIG. 6 is a block diagram schematically illustrating the configuration of a communication system 100 #2 according to a second comparative example for comparison with the communication system 100 according to the first embodiment.

The communication system 100 #2 includes a network 101A #2 and a network 101B #2.

The network 101A #2 includes relay devices 102A #2 and 102B #2 and communication devices 103A and 103B.

The relay device 102A #2 is connected to a GM 104A #2 and a GM 104B #2, and clock-time synchronization frames for synchronizing the clock time are sent from the GM 104A #2 and the GM104B #2 to the relay device 102A #2.

The network 101B #2 includes relay devices 102C #2 and 102D #2 and communication devices 103C and 103D.

The relay device 102C #2 is connected to the GM 104B #2 and the GM 104A #2, and clock-time synchronization frames for synchronizing the clock time are sent from the GM 104B #2 and the GM104A #2 to the relay device 102C #2.

In the configuration illustrated in FIG. 6, the GMs 104A #2 and 104B #2 each include two clock-time information distribution ports for sending clock-time synchronization frames.

Here, each of the relay devices 102A #2 to 102D #2 can be implemented by, for example, a relay device having a clock-time synchronization function.

In the configuration illustrated in FIG. 6, since each of the GMs 104A #2 and 104B #2 has two clock-time information distribution ports, clock-time information can be distributed to both the networks 101A #2 and 101B #2.

In the configuration illustrated in FIG. 6, two GMs are present in each of the networks 101A #2 and 101B #2.

Therefore, each of the communication devices 103A to 103D selects the GM having high priority (for example, 104A #2) by using the BMCA or the like and synchronizes the clock time with the clock time of the selected GM.

Figure 7:
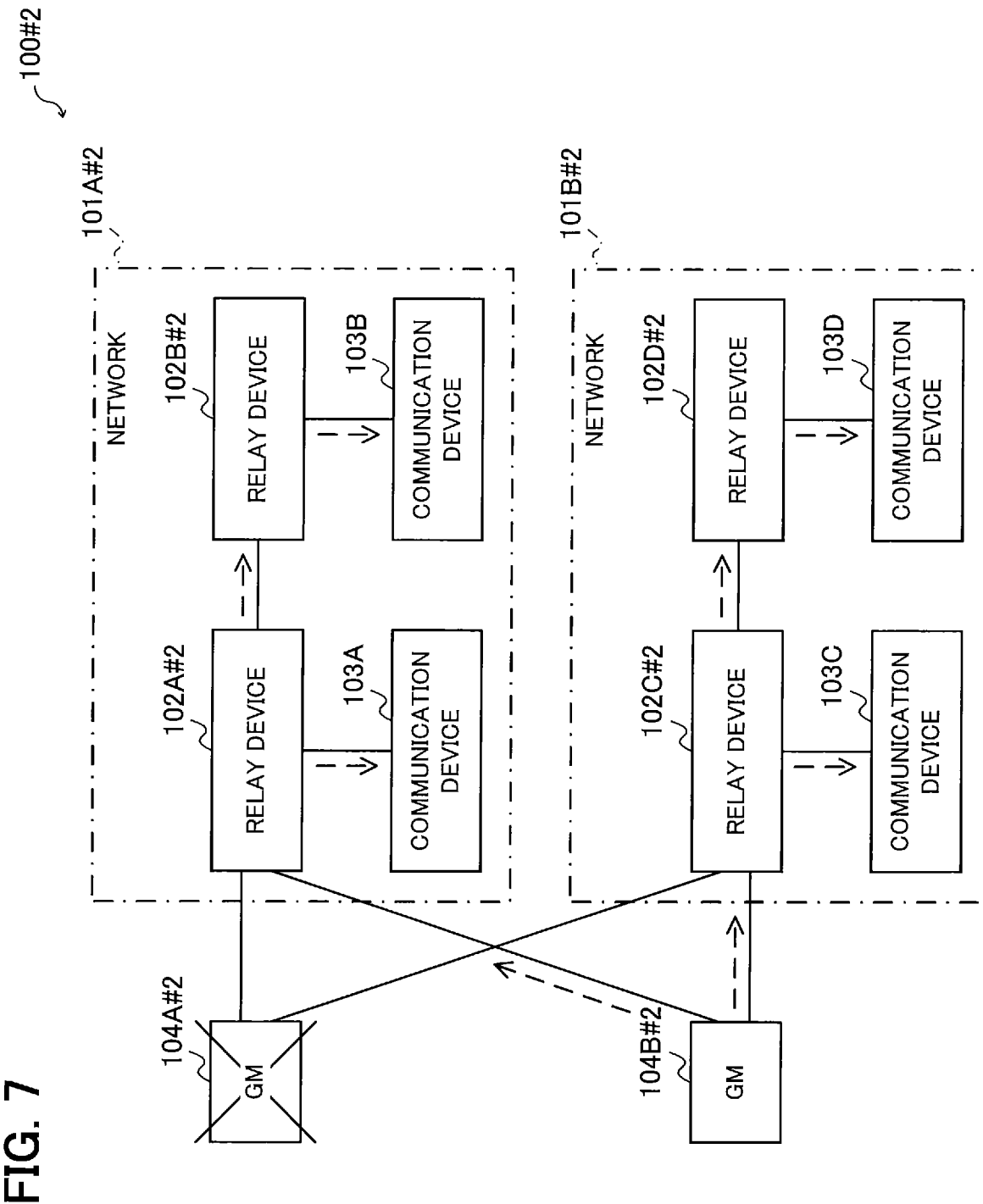
FIG. 7 is a block diagram for describing a clock-time-information distribution path when one GM fails in the second comparative example.

In the configuration illustrated in FIG. 6, even if the GM 104A #2 fails, for example, as illustrated in FIG. 7, the GM 104B #2 operating normally can distribute clock-time information to both the networks 101A #2 and 101B #2. Therefore, even in such a case, the service can be continuously provided on both networks 101A #2 and 101B #2.

Moreover, the service can be continuously provided even in case of double failure, which is a state in which failure or malfunction occurs in an operating network 101A #2, 101B #2, before replacement of the failed GM 104A #2, except for when (a) both GMs fail or (b) communication failure (for example, failure of a relay device or failure of the communication path between relay devices) occurs in both networks. Therefore, it can be said that the configuration illustrated in FIG. 6 has higher fault tolerance than that of the configuration illustrated in FIG. 5.

In general, the price of a GM increases in proportion to an increase in the number of ports capable of distributing clock-time information.

Figure 8:
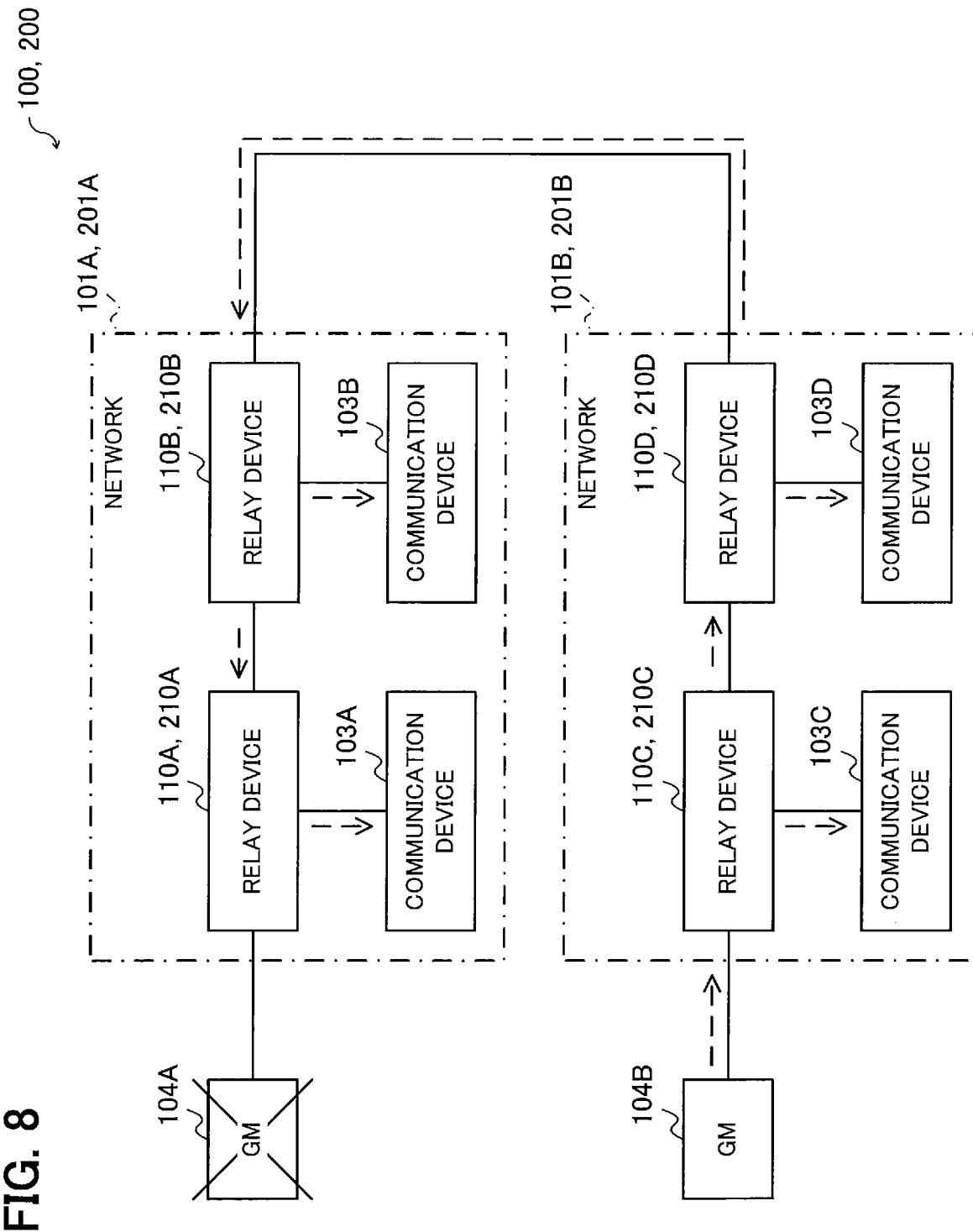
FIG. 8 is a block diagram for describing a clock-time-information distribution path when one GM fails in the first and second embodiments.

FIG. 8 is a block diagram for describing a clock-time information distribution path when one GM 104A fails in the communication system 100 according to the first embodiment.

As illustrated in FIG. 8, the service can be continuously provided in both networks 101A and 101B even if one GM 104A fails because the clock-time information distributed by the GM 104B operating normally is distributed to both networks 101A and 101B via the wiring between the relay devices 110B and 110D.

Moreover, the service can be continuously provided even in case of double failure, which is a state in which failure or malfunction occurs in the operating network 101A, 101B, before replacement of the failed GM 104A.

As described above, the communication system 100 according to the first embodiment can achieve availability equivalent to that of the communication system 100 #2 illustrated in FIG. 6 by using the relay devices 110B and 110D having a filter function for transmitting only clock-time synchronization frames by using the GMs 104A and 104B each having one clock-time information distribution port, as in the communication system 100 #1 illustrated in FIG. 5.

Although the first embodiment describes an example in which both networks 101A and 101B are connected by one wire, the first embodiment is not limited to such an example. For example, both networks 101A and 101B can be connected by two wires by also connecting the relay devices 110A and 110C.

When both networks 101A and 101B are connected with two wires, a loop path is formed, but communication frames other than the clock-time synchronization frames are discarded by the filter function of the relay device 110, and the clock-time synchronization frames are terminated by the relay device 110 at which they are received, so that a storm in which the communication frames circulate in the loop path or communication failure accompanying the storm does not occur.

Second Embodiment

The communication system 100 according to the first embodiment proposes a clock-time synchronization method in which the GMs 104A and 104B have a redundant configuration and at least one GM can be expected to operate normally.

In contrast, the second embodiment proposes a clock-time synchronization method for a case in which the GMs 104A and 104B distributing clock-time information are absent due to failure or the like, and the operation must be continued during the period until the GMs 104A and 104B are replaced.

As illustrated in FIG. 1, a communication system 200 according to the second embodiment includes a network 201A and a network 201B.

The network 201A includes relay devices 210A and 210B and communication devices 103A and 103B.

The relay device 210A is connected to a GM 104A, and clock-time synchronization frames for synchronizing the clock time are sent from the GM 104A to the relay device 210A.

The network 201B includes relay devices 210C and 210D and communication devices 103C and 103D.

The relay device 210C is connected to a GM 104B, and clock-time synchronization frames for synchronizing the clock time are sent from the GM 104B to the relay device 210C.

As in the first embodiment, the network 201A and the network 201B constitute different segments also in second embodiment.

The communication devices 103A to 103D and the GMs 104A and 104B of the communication system 200 according to the second embodiment are the same as the communication devices 103A to 103D and the GMs 104A and 104B, respectively, in the communication system 100 according to the first embodiment.

Note that since the relay devices 210A to 210D have the same configuration, hereinafter, any one of the relay devices 210A to 210D will be referred to as a relay device 210 when there is no need to distinguish between them.

As illustrated in FIG. 2, the relay device 210 according to the second embodiment includes a plurality of physical ports 111-1 to 111-N, a clock-time-information-relay-port setting unit 112, a layer-2 protocol processing unit 113, and a clock-time synchronization processing unit 214.

The plurality of physical ports 111-1 to 111-N, the clock-time-information-relay-port setting unit 112, and the layer-2 protocol processing unit 113 in the relay device 210 according to the second embodiment are the same as the plurality of physical ports 111-1 to 111-N, the clock-time-information relay port setting unit 112, and the layer-2 protocol processing unit 113, respectively, in the relay device 110 according to the first embodiment.

The clock-time synchronization processing unit 214 according to the second embodiment generates clock-time synchronization frames indicating the clock time counted by the time counting unit 115 when a GM connected to any of the physical ports 111-1 to 111-N becomes absent. The clock-time synchronization frames generated by the clock-time synchronization processing unit 214 are also referred to as alternative clock-time synchronization frames.

For example, the clock-time synchronization processing unit 214 performs the same processing as the clock-time synchronization processing unit 114 according to the first embodiment and generates a clock-time synchronization frame based on the specification of the IEEE1588 PTP or IEEE802.1AS by using the clock time counted by the time counting unit 115 in place of the GMs 104A and 104B when the GMs 104A and 104B become absent and when the clock-time synchronization processing unit 214 is located in the nearest neighbor of the last operating GM.

For example, the clock-time synchronization processing unit 214 checks the number of relay stages between the relay device 210 and the last operating GM by using the index value "stepsRemoved" stored in the Priority Vector area in the Announce message included in the clock-time synchronization packet defined by the BMCA. Note that "stepsRemoved" is an index value indicating the number of relay stages from a GM. For example, when "stepsRemoved"=1, it can be determined that a GM is located in the nearest neighbor of the relay device 210.

The GMs 104A and 104B send clock-time synchronization control frames known as Announce frames in a given cycle; thereby, the clock-time synchronization processing unit 214 can determine that the GMs 104A and 104B are absent when the physical ports 111-1 to 111-N connected to the GM 104A or the GM 104B do not receive an Announce frame in a predetermined period. In other words, the clock-time synchronization processing unit 214 can determine that the GMs 104A and 104B are absent when a predetermined frame is not received in a predetermined period.

The clock-time synchronization processing unit 114 then determines the physical port to which the clock-time synchronization frame generated on the basis of the specification of the IEEE1588 PTP or IEEE802.1AS is to be output. Here, clock-time synchronization frames are sent from all physical ports via the layer-2 protocol processing unit 113.

Figure 9:
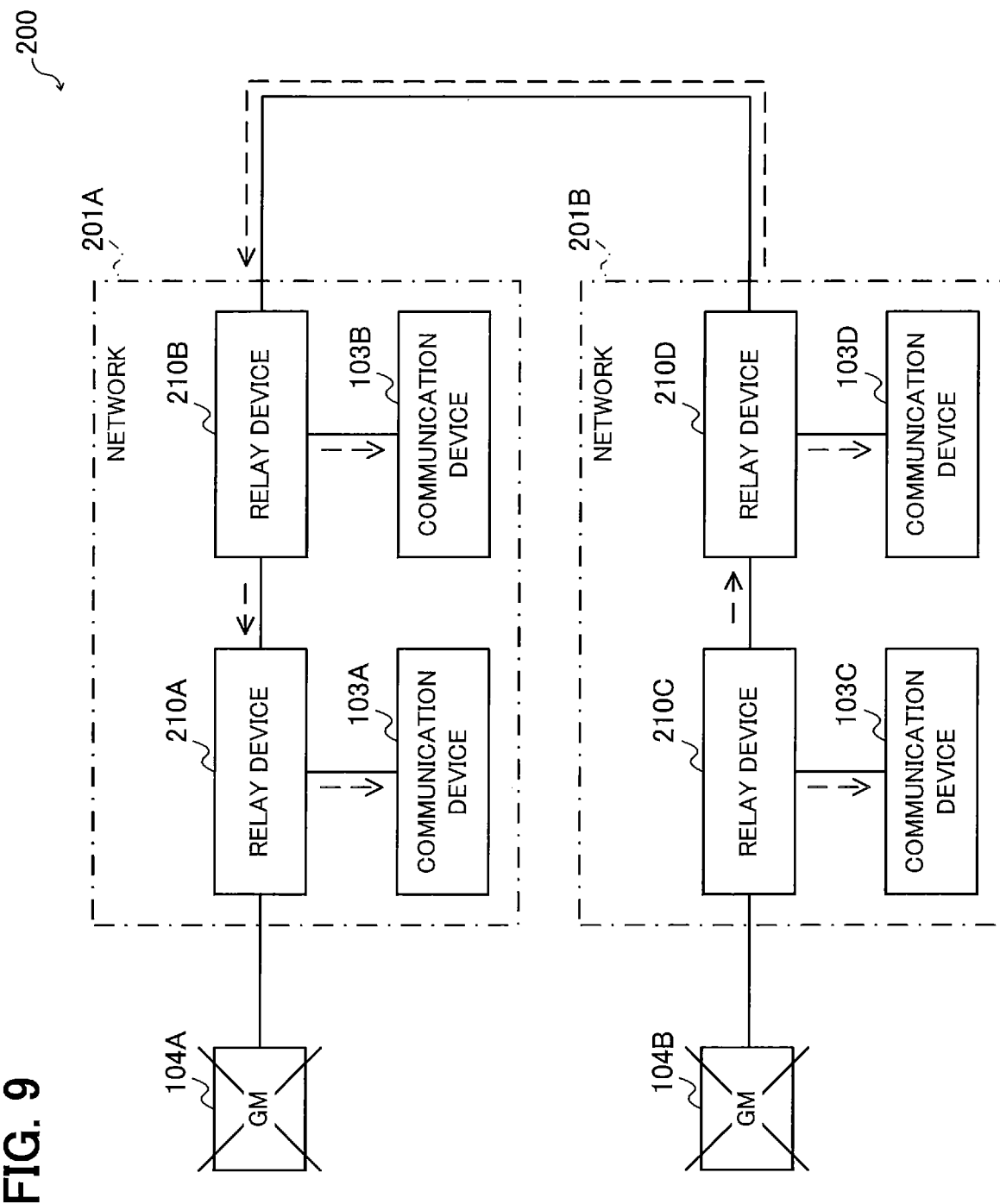
FIG. 9 is a block diagram for describing a clock-time-information distribution path when two GMs fail in the second embodiment.

As described above, according to the second embodiment, when one GM 104A fails and the service is continuously provided on both networks 201A and 201B by clock-time information distributed by the GM 104B operating normally, for example, as illustrated in FIG. 8, the service can be continuously provided on both networks 201A and 201B even if the GM 104B fails, as illustrated in FIG. 9, by distributing clock-time information from the relay device 210C adjacent to the GM 104B, which was distributing clock-time information until most recently.

Note that since the oscillator or vibrator serving as the clock source of the relay device 210 has accuracy lower than the clock-time accuracy of the GMs 104A and 104B, and there is variation in the clock deviation of each device, it is desirable to select the relay device 210 located in the nearest neighbor of the last operating GM as the relay device 210 for synchronizing the clock time.

Note that the alternative clock-time synchronization frames generated by the first relay device are also referred to as first alternative clock-time synchronization frames, and the alternative clock-time synchronization frames generated by the second relay device are also referred to as second alternative clock-time synchronization frames.

DESCRIPTION OF REFERENCE CHARACTERS 100, 200 communication system; 101, 201 network; 103 communication device; 104 GM; 110, 210 relay device; 111-1 to 111-N physical port; 112 clock-time-information-relay-port setting unit; 113 layer-2 protocol processing unit; 114, 214 clock-time synchronization processing unit; 115 time counting unit.

What is claimed is:

1. A relay device comprising: a plurality of ports to receive frames; and
processing circuitry to transfer a frame received at one of the ports to at least one of the ports,
wherein the processing circuitry has a filtering function for blocking frames other than a clock-time synchronization frame during transfer involving the port selected from the ports, the clock-time synchronization frame being used for synchronizing clock time wherein as a result of using the filtering function, the processing circuitry discards a first frame when the first frame is not the clock-time synchronization frame, the first frame being a frame received by the selected port,
wherein the processing circuitry applies the filtering function to the frame received by a port other than the selected port, and
wherein the processing circuitry does not transfer a second frame to the selected port when the second frame is not the clock-time synchronization frame, the second frame being a frame received by a port other than the selected port.

2. The relay device according to claim 1, wherein the processing circuitry applies the filtering function to the frame received by the selected port.

3. The relay device according to claim 2, wherein the processing circuitry does not transfer a first frame from any of the ports when the first frame is not the clock-time synchronization frame, the first frame being a frame received by the selected port.

4. The relay device according to claim 2, wherein the processing circuitry counts clock time;
generates an alternative clock-time synchronization frame indicating the clock time counted by the processing circuitry when a clock-time distribution server is connected to the selected port and the selected port does not receive a predetermined frame in a predetermined period, the clock-time distribution server counting reference clock time and sending the clock-time synchronization frame; and
sends the alternative clock-time synchronization frame as the clock-time synchronization frame from the ports except the selected port.

5. The relay device according to claim 3, wherein the processing circuitry counts clock time;
generates an alternative clock-time synchronization frame indicating the clock time counted by the processing circuitry when a clock-time distribution server is connected to the selected port and the selected port does not receive a predetermined frame in a predetermined period, the clock-time distribution server counting reference clock time and sending the clock-time synchronization frame; and
sends the alternative clock-time synchronization frame as the clock-time synchronization frame from the ports except the selected port.

6. The relay device according to claim 1, wherein the processing circuitry transfers a second frame to the selected port when the second frame is the clock-time synchronization frame, the second frame being a frame received by a port other than the selected port.

7. The relay device according to claim 6, wherein the processing circuitry
counts clock time;
generates an alternative clock-time synchronization frame indicating the clock time counted by the processing circuitry when a clock-time distribution server is connected to the selected port and the selected port does not receive a predetermined frame in a predetermined period, the clock-time distribution server counting reference clock time and sending the clock-time synchronization frame; and sends the alternative clock-time synchronization frame as the clock-time synchronization frame from the ports except the selected port.

8. The relay device according to claim 1, wherein the processing circuitry
counts clock time;
generates an alternative clock-time synchronization frame indicating the clock time counted by the processing circuitry when a clock-time distribution server is connected to the selected port and the selected port does not receive a predetermined frame in a predetermined period, the clock-time distribution server counting reference clock time and sending the clock-time synchronization frame; and
sends the alternative clock-time synchronization frame as the clock-time synchronization frame from the ports except the selected port.

9. The relay device according to claim 1, wherein the processing circuitry counts clock time; generates an alternative clock-time synchronization frame indicating the clock time counted by the processing circuitry when a clock-time distribution server is connected to the selected port and the selected port does not receive a predetermined frame in a predetermined period, the clock-time distribution server counting reference clock time and sending the clock-time synchronization frame; and sends the alternative clock-time synchronization frame as the clock-time synchronization frame from the ports except the selected port.

10. A communication system comprising: a first network including a first relay device; and a second network including a second relay device and constituting a segment different from a segment of the first network, wherein, the first relay device comprises: a plurality of first ports to receive frames; and first processing circuitry to transfer a frame received by one of the first ports from at least one of the first ports, a first clock-time-information relay port included in the first ports is connected to the second relay device, the first processing circuitry has a first filtering function for blocking frames other than a clock-time synchronization frame during transfer involving the first clock-time-information relay port, the clock-time synchronization frame being used for synchronizing clock time, the second relay device comprises: a plurality of second ports to receive frames; and second processing circuitry to transfer a frame received by one of the second ports to at least one of the second ports, a second clock-time-information relay port included in the second ports is connected to the first relay device, and the second processing circuitry has a second filtering function for blocking frames other than the clock-time synchronization frame during transfer involving the second clock-time information relay port, wherein as a result of using the first filtering function, the first processing circuitry discards a first frame when the first frame is not the clock-time synchronization frame, the first frame being a frame received by the first clock-time-information relay port,
wherein, the first processing circuitry counts clock time; generates a first alternative clock-time synchronization frame indicating the clock time counted by the first processing circuitry when a first clock-time distribution server counting reference clock time and sending the clock time synchronization frame is connected to a first port selected from the first ports and when the selected first port does not receive the clock-time synchronization frame in a predetermined period; sends the first alternative clock-time synchronization frame as the clock-time synchronization frame from the first ports except the selected first port, the second processing circuitry counts clock time; generates a second alternative clock-time synchronization frame indicating the clock time counted by the second processing circuitry when a second clock-time distribution server counting reference clock time and sending the clock-time synchronization frame is connected to a second port selected from the second ports and when the selected second port does not receive the clock-time synchronization frame in a predetermined period; and sends the second alternative clock-time synchronization frame as the clock-time synchronization frame from the second ports except the selected second port.

* * * * *